United States Patent [19]
Shaffer et al.

[11] Patent Number: 5,761,294
[45] Date of Patent: Jun. 2, 1998

[54] METHOD AND SYSTEM FOR CONNECTING A DIGITAL PHONE LIMITED TO ANALOG TRANSMISSIONS

[75] Inventors: Shmuel Shaffer, Palo Alto; William J. Beyda, Cupertino, both of Calif.

[73] Assignee: Siemens Business Communication Systems, Santa Clara, Calif.

[21] Appl. No.: 683,441

[22] Filed: Jul. 18, 1996

[51] Int. Cl.$^6$ .............................. H04M 7/00; H04M 11/00; H04M 1/00; H04J 3/12
[52] U.S. Cl. .............. 379/230; 370/271; 370/466; 370/493; 370/524; 379/90.01; 379/399
[58] Field of Search ............................ 370/259, 524, 370/264, 265, 271, 465, 466, 467, 493, 494, 495; 379/201, 207, 230, 100, 210, 156, 157, 159, 160, 100.01, 90.01, 93.01, 93.05, 93.06, 93.09, 93.15, 93.31, 399

[56] References Cited

U.S. PATENT DOCUMENTS

| | | | |
|---|---|---|---|
| 4,998,274 | 3/1991 | Ephraim | 379/160 X |
| 5,305,377 | 4/1994 | D'Arcy et al. | 370/467 X |
| 5,412,709 | 5/1995 | Jarvis et al. | 379/210 X |
| 5,440,613 | 8/1995 | Fuentes | 455/436 |
| 5,459,780 | 10/1995 | Sand | 379/265 |
| 5,502,727 | 3/1996 | Catanzaro et al. | 370/271 |

*Primary Examiner*—Harry S. Hong

[57] ABSTRACT

A method and system of enabling incoming and outgoing call capability for a digital telephone that is limited to analog transmissions include providing a converter that locally supports the protocol of the digital telephone, but that converts digitized signals of voice information, party-specific call messages and call-handling call messages into outgoing analog signals. In one embodiment, one analog signal carries the voice information and a second analog signal carries the party-specific and call-handling call messages, with the first analog signal being transmitted via a public switching telephone network and the second analog signal being transmitted via a data network. Received analog signals are reconverted to digital signals having the appropriate protocol. In another embodiment, the voice information, the party-specific call messages and the call-handling call messages are transmitted along a single digital link between two converters, typically by means of a data network.

12 Claims, 4 Drawing Sheets

METHOD AND SYSTEM FOR CONNECTING A DIGITAL PHONE LIMITED TO ANALOG TRANSMISSIONS

BACKGROUND OF THE INVENTION

The invention relates generally to methods and systems for providing access to a digital telephone and more particularly to providing such access when the digital telephone is limited to analog transmissions.

DESCRIPTION OF THE RELATED ART

Digital telephones provide display capabilities and other advanced features that are typically not available when using a conventional telephone. For example, information regarding an incoming call may be displayed on a readout of the digital telephone. The displayed information may include calling party identification, such as the trunk number or the trunk group number of the calling party, or even the name of the party. Moreover, if the incoming call has been forwarded, the displayed information may include the originally called number and the reason for forwarding, e.g., forwarded from a ring-busy telephone or a ring-no-answer telephone. The digital telephone may also include features such as a light emitting diode (LED) display or other light display that alerts a user that a message has been stored for the user within a voice messaging system. Digital telephones of this type are often referred to as "feature phones." The "party-specific call messages" of a feature digital phone are distinguishable from "call-handling call messages." The party-specific call messages are intended to provide information to one or both of the parties of a call session. The information may be conveyed by means of a visual display or by audio alert. The party-specific call messages are often unique to the call session. On the other hand, the call-handling call messages are often transparent to the parties and relate directly to telephony signal exchanges. Examples of call-handling call messages include CONNECT, CONNECT ACKNOWLEDGE, DISCONNECT, and RELEASE signals.

The party-specific call messages are also distinguishable from the transmission of user data over telephone lines. One or both of the parties of a call session may initiate the transmission of user data during the session. For example, an agent of an automatic call distribution (ACD) service for processing sales to calling customers may send and receive product and order information during the course of a call. The user data is unrelated to telephone service.

Conventionally, digital phones are supported by digital communication processing devices, such as a private branch exchange (PBX) or a central office. A digital PBX may be located on the premises of a customer, such as a corporation, and treats telephones and line trunks in a manner similar to treatment of input and output devices by a computer system.

Typically, a digital telephone is on the same premises as the PBX or other device that supports the digital communication processing. However, persons who are off-site of the PBX or similar system may wish to have access to the advantages of digital communication. For example, a telecommuter may desire a "dual presence" (office and home) in which calls from the home of the telecommuter would appear to be made from the on-site office. Optionally, a digital link may be formed between the system and the off-site location. For example, an integrated services digital network (ISDN) link having a pair of B-channels for carrying user data and/or digitized voice information and having a D-channel for carrying digitized call messages may be employed to allow a remote user to take advantage of digital phone features.

Two concerns with providing a digital link between a digital telephone and a remote system for supporting the phone relate to availability and cost. Digital links are not universally available. Even if the user has access to such a link, the protocol of the link and the protocol of the system may not be compatible. Moreover, such links may be significantly more expensive than analog links.

What is needed is a method and system for enabling incoming and outgoing call capability of a digital telephone that is limited to analog transmissions.

SUMMARY OF THE INVENTION

A method and system of utilizing analog transmissions to enable communication between a digital telephone and a remote site that supports digital communication processing includes converting digitized voice information, digitized call-handling call messages, and digitized party-specific call messages into outgoing analog signals. The outgoing analog signals are transmitted to the remote location, where reconversion produces the digitized voice information and the two forms of digitized call messages. In one embodiment, the voice information is transmitted via analog phone lines of a public switching telephone network (PSTN), while the call messages are transmitted via a data network. In an alternative embodiment, the voice information and call messages are transmitted using a single analog line connected to a data network.

Regarding the party-specific call messages, the method and system typically includes providing a visual display that is responsive to this type of call messaging. For example, the digital telephone may include one or both of a light display and a visual readout.

In the embodiment in which call messages are transmitted via a data network, such as the Internet, user data or digitized voice may also be transmitted.

DETAILED DESCRIPTION

Figure 1:
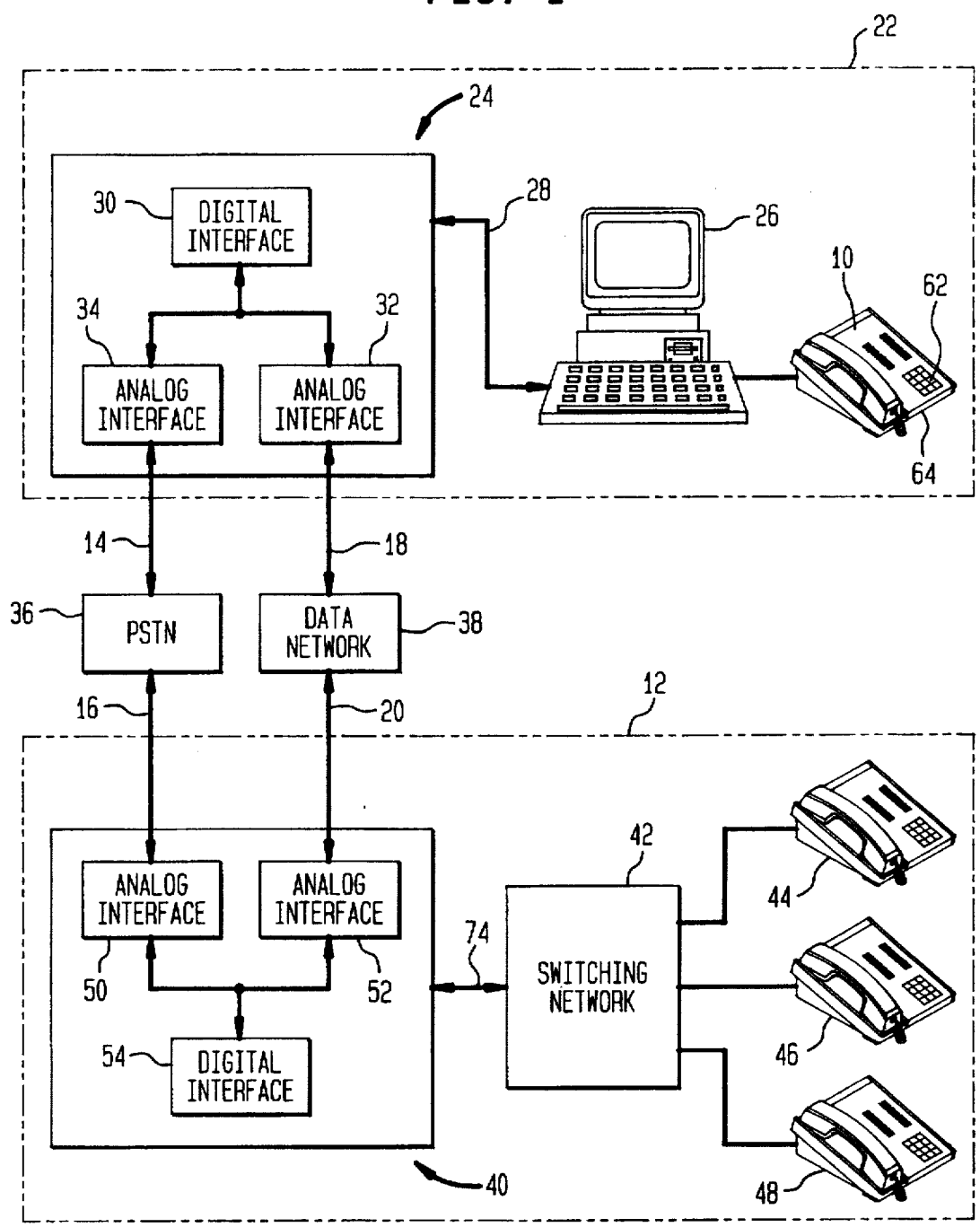
FIG. 1 is a block diagram of one embodiment of a system for enabling communication between a digital telephone and a remote interface site in accordance with one embodiment of the invention.

With reference to FIG. 1, a system is shown as having a digital telephone 10 that is linked to a remote site 12 by analog lines 14, 16, 18 and 20. While it is not important to the invention, the digital telephone may be at the home premises 22 of a user, while the remote site 12 is a corporate environment. The digital telephone could alternatively be located at a small business site or any other location in which communication is limited to analog links because of considerations such as the cost or unavailability of digital links.

A converter 24 is also located at the off-premises location 22 of the digital phone 10. The converter may be a stand-alone device or combination of devices, or may be a converter card within a personal computer 26 that is part of a telephone station. As will be explained more fully below, if the transmission of user data is not a concern, the personal computer 26 can be omitted.

The digital telephone 10 is connected to the converter 24 by a digital link 28, either directly or through the personal computer 26. The converter includes a digital interface 30 and a pair of analog interfaces 32 and 34. In a least complex embodiment, the digital interface is a digital-to-analog converter that receives digital signals from the telephone 10 and personal computer 26, and generates corresponding analog signals for input to the analog interfaces. In the receive mode, the digital interface receives analog signals from the interfaces 32 and 34 in order to generate intelligible signals to the telephone and personal computer. However, the operation of the digital interface will typically require a greater amount of complexity. For example, a protocol conversion is typically required for compatibility with signal requirements for transmission via a public switching telephone network (PSTN) 36 or via a data network 38. The digital phone may be an ISDN phone or a phone having a proprietary protocol. Consequently, protocol conversion will be necessary if the data network is a local area network (LAN), a frame relay network, an X.25 network, a connectionless broadband data service (CBDS), a switched multi-megabyte data service (SMDS), the Internet or other internet, or an intranet.

The analog interfaces 32 and 34 may merely be telephone jacks. On the other hand, the analog interfaces may include more complex structure. For example, the analog interface 32 may include a modem. If the data network 38 represents an Internet service provider (ISP), call messages to and from the digital telephone 10 and user data to and from the personal computer 26 may be sent as transmission control protocol/Internet protocol (TCP/IP) messages through the ISP, so that the digital interface 30 of the converter 24 is in communication with the ISP via a standard analog telephone line 18 and a modem. In this embodiment, the IP address may be the address of a converter 40 at the remote site 12. The components of the remote converter 40 can then be a mirror image of the components of the off-premises converter 24.

The remote site 12 includes the converter 40, a switching network 42 and a number of digital telephones 44, 46 and 48. The switching network 42 is a device that supports digital communication processing. In one embodiment, the switching network is a PBX. The remote converter 40 includes a pair of analog interfaces 50 and 52 and a digital interface 54. The analog interface may merely be connectors, or may include hardware such as a modem. The digital interface 54 typically provides protocol conversion. In the preferred embodiment, the remote converter 40 is a multi-port device that permits a number of off-premises digital telephones 10 to communicate via the digital switching network 42. Commonly 24-port (or higher) digital circuits are used to link a PBX to a central office of the PSTN 36, so that the converter 40 may easily be adapted to combine the individual analog lines to a higher capacity digital circuit.

Optionally, the converter 40 may be at a site that is remote from the switching network 42 that supports the on-premises digital telephones 44-48. However, the preferred embodiment is one in which the converter 40 and the switching network 42 are at a common site.

The operation of the system of FIG. 1 will be described with reference to FIG. 2. The converter 24 at the off-premises location 22 is capable of supporting a digital protocol for operating the digital telephone 10, as indicated at step 56. If the telephone 10 and its connection to the personal computer 26 are of the type that utilize a pair of user channels (64 kbps voice, 64 kbps data) and one signaling channel (16 kbps digital signaling), the digital link 28 that bears these three channels is connected to the converter 24. In the double analog line 14 and 18 embodiment, the information from the voice channel is output via the analog interface 34 to the analog line 14 of the PSTN 36. Thus, in step 58, the voice channel is converted for analog transmission to the remote converter 40 by means of the PSTN. Because the voice information is passed through the PSTN, a higher quality of service (QoS) is obtainable relative to transmission of voice data through a data network 38, such as the Internet. Simultaneously with step 58, a step 60 of converting party-specific and call-handling call messages is executed. These are the messages that are contained within the signaling channel, if the protocol of the digital telephone 10 supports a separate signaling channel. The call-handling call messages are common to almost all telephones. Examples of call-handling call messages include CONNECT, CONNECT ACKNOWLEDGE, DISCONNECT, and RELEASE call messages. On the other hand, the party-specific call messages are call messages that are typically only utilized for feature phones. Such call messages are often unique to the call session and are made apparent to the user by either a display screen 62 or one or more light indicators 64, or both. While the display screen 62 and light indicator 64 are shown as being contained on the digital phone 10, this is not critical. Alternatively, the party-specific call messages may be displayed on the monitor of the personal computer 26. Examples of party-specific call messages include an identifier of a calling party or a trunk number of the calling party. If the incoming call has been forwarded from one of the on-premises digital phones 44, 46 and 48, the party-specific call message may be the identification of the originally called number and the reason that the call was forwarded, e.g., forwarding from a ring-busy telephone or a ring-no-answer telephone.

In steps 66 and 68, the voice information is transmitted as a voice analog signal to the remote site 12 via the PSTN 36 and the call messages are transmitted as a message analog signal to the remote site via the data network 38. In addition to the transmission of message information through the data network, any user data from the personal computer 26 can be packetized and sent to the remote site through the remote network. For example, user information from a 64 kbps data channel of the digital link 28 can be packetized and sent as TCP/IP packets on the ISP to an Internet address. The user data can be sent to the Internet address of the remote converter 40, if the user wishes to utilize the switching capabilities of the switching network 42. However, it is more likely that the user will prefer to send the user data directly to a data address or an Internet address on a LAN or any other data network.

At steps 58 and 60, the call messages that pass between the digital phone 10 and the remote switching network 42 are removed from transmission with the voice information. At step 70, the separate analog signals are received and are preferably rejoined. The call messages are not time-critical, so that synchronization of the voice information and party-specific call messages is not required. The voice and message data is reconverted at step 72 to the digital format and to the appropriate digital protocol. A digital link 74 between the remote converter 40 and the switching network 42 may be a conventional multi-line trunk of the switching network 42.

While the embodiment of FIG. 1 has been described as having analog lines 16 and 20 that extend from the PSTN 36 and the data network 38 to the remote site 12, this is not critical. One or both of the links from the PSTN and the data network can be digital links.

Figure 3:
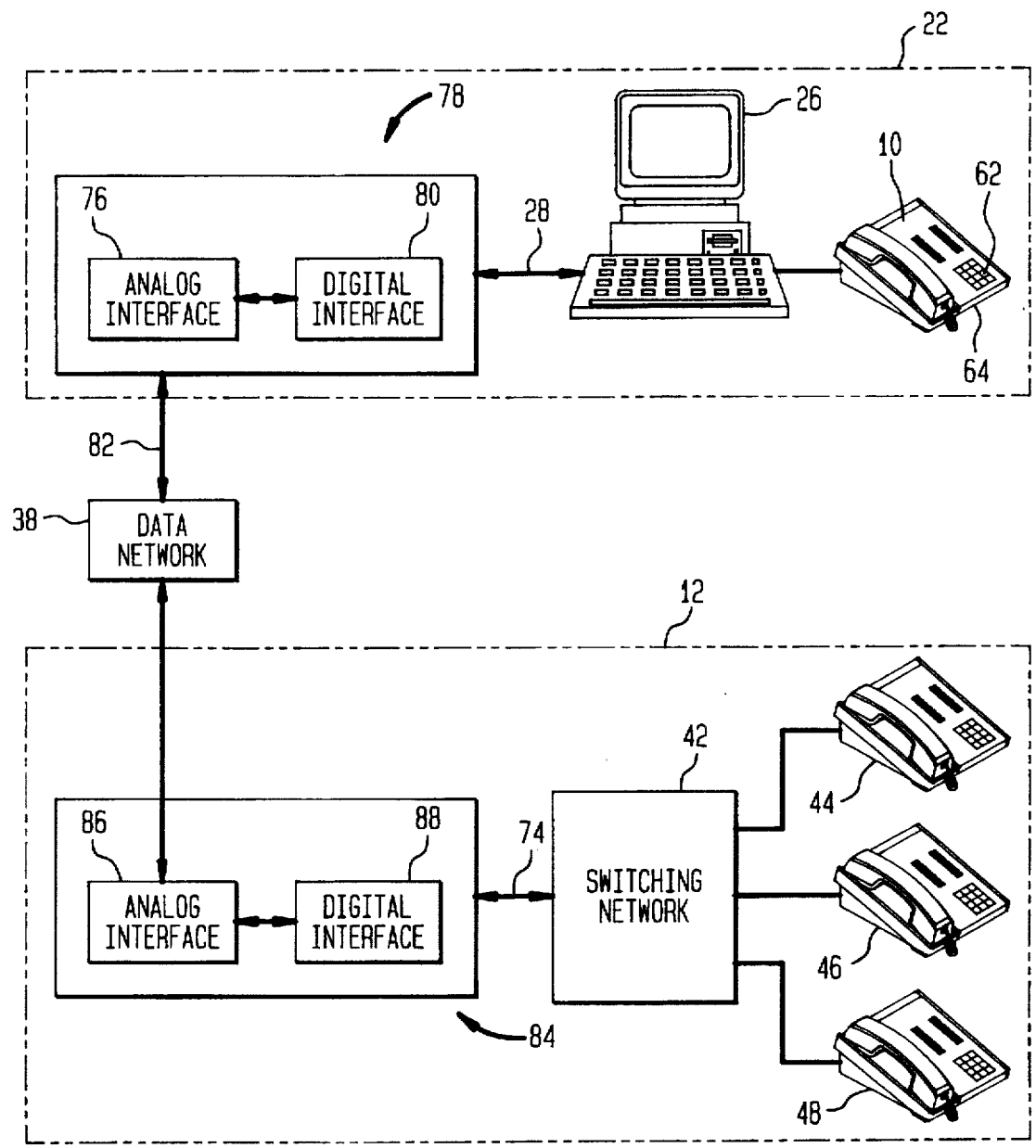
FIG. 3 is a block diagram of a second embodiment of the invention, using a single analog link.

A second embodiment of the invention is shown in FIG. 3. Those components of FIG. 3 that are functionally identical to components of the embodiment of FIG. 1 utilize the same reference numerals. The significant difference between the two embodiments is that the voice information joins the party-specific and call-handling call messages in transmission via the data network 38. Thus, a single analog interface 76 is utilized at a converter 78 within the off-premises location 22 of the user. The converter 78 includes a digital interface 80 that functions in the same manner as described above, except without a need to divide the voice information from the call messages. The digital interface supports the digital protocol of the telephone 10, packetizing the voice information if necessary, and processing the party-specific messages that activate the display screen 62 and/or the light indicators 64. The analog interface 76 will typically include a high speed modem for transmitting the converted signals along an analog link 82 to the data network 38.

At the remote site 12, a converter 84 includes an analog interface 86 and a digital interface 88. The analog and digital interfaces cooperate to send and receive digital signals that are compatible with the switching network 42.

The embodiment of FIG. 3 may be used when voice quality of service is not a significant issue. Voice transmission over the Internet forces the voice information to be digitized, packetized, compressed, and transmitted via a modem. As a result, the voice information is likely to suffer all of the delays and reduced QoS inherent in a non-isochronous network.

An advantage of the embodiment of FIG. 3 over prior art systems in which voice information is sent over a data network, such as the Internet, is that the party-specific call messages are transmitted. Thus, a user is able to take advantage of the transmission and reception of the party-specific messages that activate either or both of the display screens 62 and the light indicators 64.

Figure 4:
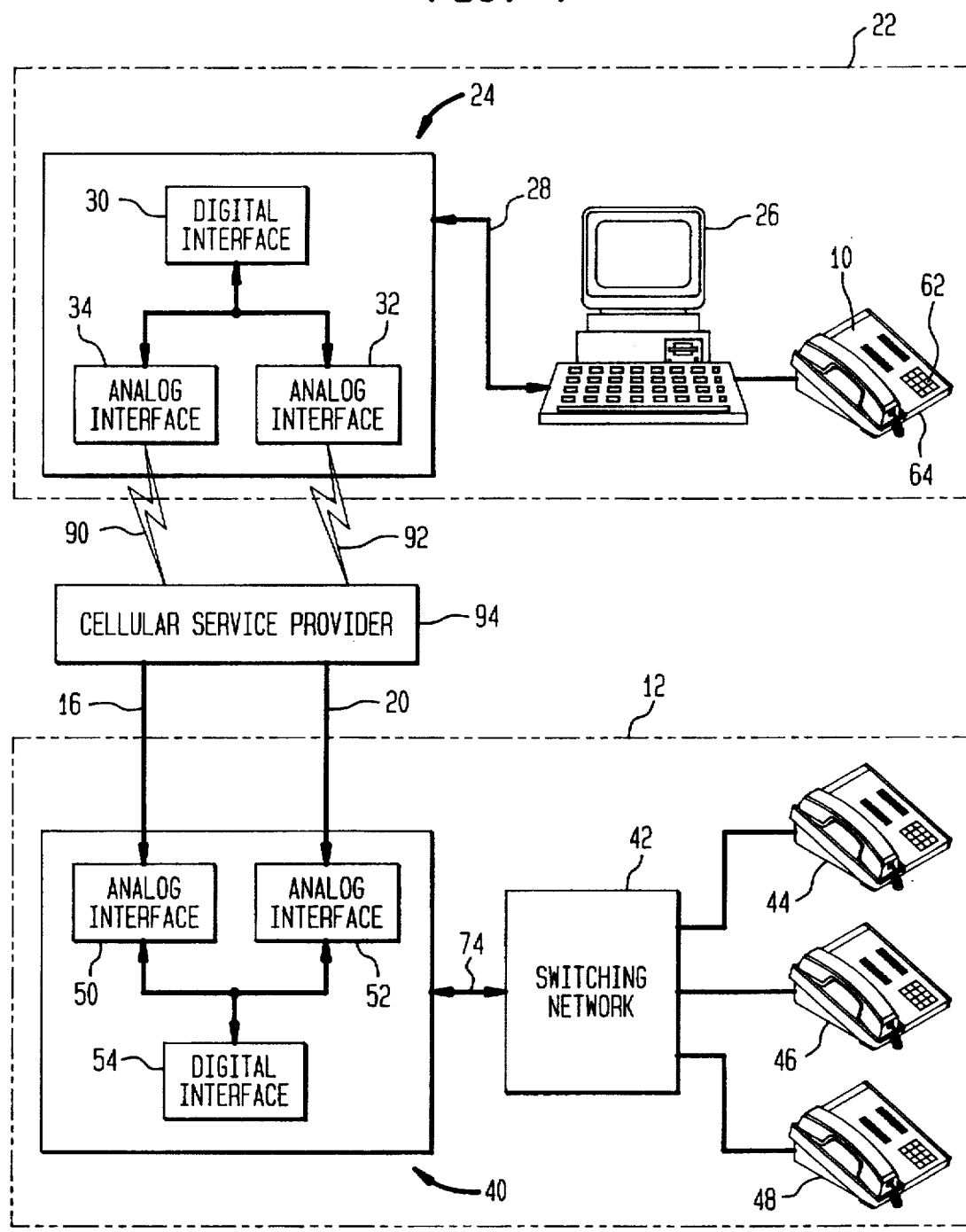
FIG. 4 is a block diagram of a third embodiment of the invention, using wireless analog transmissions.

FIG. 4 illustrates a third embodiment of the invention. In this embodiment, the analog links 90 and 92 from the off-premises converter 24 are wireless links to a cellular service provider 94. All of the other features of FIG. 4 are identical to FIG. 1. However, the user station that is comprised of the digital telephone 10 and the personal computer 26 may be replaced with a hand-held cellular unit that utilizes party-specific call messages. All of the steps of FIG. 2 still apply to the operation of the embodiment of FIG. 4.

A number of other variations of the embodiment of FIG. 4 are contemplated. For example, the wireless analog links 90 and 92 may be replaced by a single wireless analog link, so that the operation is similar to the embodiment of FIG. 3. Alternatively, the analog line 18 in FIG. 1 may be a wired analog link to the data network 38, while the connection to a cellular service provider is a wireless analog link for transmitting voice information.

Figure 2:
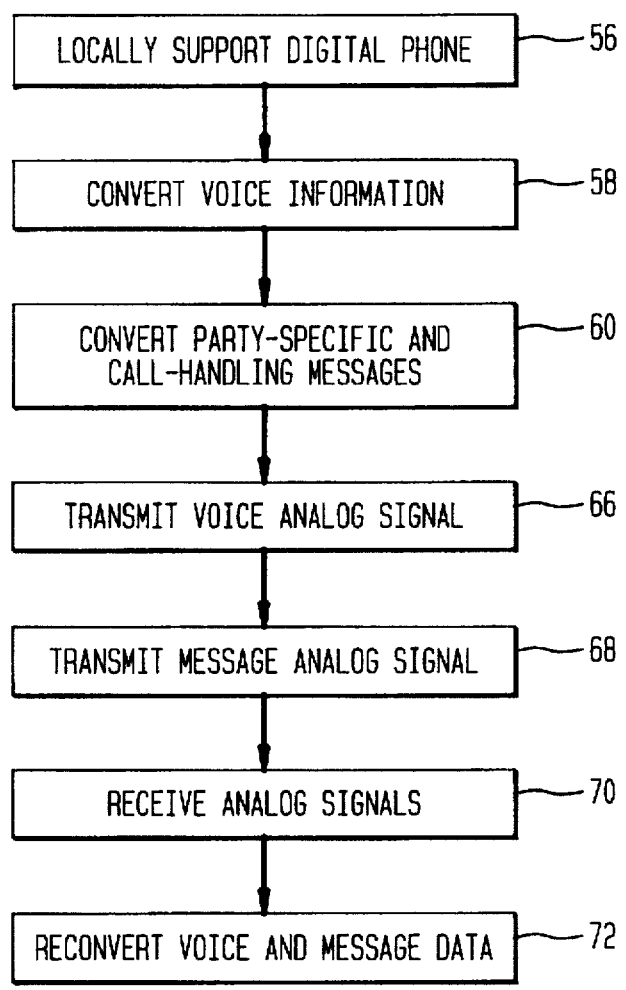
FIG. 2 is a diagram of steps for enabling communication between the digital telephone and the remote interface site of FIG. 1.

Referring to all of the embodiments, but specifically to FIGS. 1 and 2, an advantage of the invention is that a user is able to utilize the capabilities of digital telephones without a requirement of a digital line. Voice information can be transmitted along the PSTN 36, providing higher quality of service. Yet, the party-specific call messages rejoin the voice information at the receiving converter 24 or 40, providing the combined benefits of packet-switched technology and circuit-switched technology.

For a telecommuting user, the invention provides a full-featured, off-premises extension from a PBX. The telecommuting user appears to be on-premises and has access to the various features of a feature phone, e.g., message waiting light, screen display, and the like. If the user seeks a dual presence, simple autoset relocate call-forwarding features and/or passwords provide the capability.

We claim:

1. A method of establishing communication between a local digital telephone and a remote site that supports digital communication processing, wherein the communication occurs without digital lines, said method comprising steps of:

converting outdoing digital signals from said digital telephone into a voice analog signal of voice information and a message analog signal of call message information;

transmitting said voice analog signal to said remote site via a public telephone switching network;

transmitting said message analog signal to said remote site via a data network;

receiving voice and message analog signals from said remote site via said public telephone switching network and said data network, respectively; and converting said received voice and message analog signals from said remote site into digital signals compatible with operation of said digital telephone.

2. The method of claim 1 further comprising a step of converting said voice and message analog signals transmitted to said remote site into digitized voice and message data following reception at said remote site.

3. The method of claim 1 wherein said step of converting said received voice and message analog signals into digital signals includes imposing a selected protocol.

4. The method of claim 1 wherein said step of receiving message analog signals includes receiving both party-specific call messages and call-handling call messages via said data network.

5. A system of enabling communication between an interface site that supports digital telecommunication processing and at least one digital telephone limited to analog transmissions comprising:

for each of said digital telephone and said interface site, a conversion means for converting telephone digital signals into outgoing analog voice signals and outgoing analog message signals and for converting incoming analog voice and message signals into digital signals;

for each of said digital telephone and said interface site, first analog lines connected to said conversion means to send and receive said outgoing and incoming analog voice signals via a public telephone network; and for each of said digital telephone and said interface site, second analog lines connected to said conversion means to send and receive said outgoing and incoming analog message signals via a data network.

6. The system of claim 5 wherein said conversion means of said digital telephone includes a modem connected to said second analog lines to transmit outgoing analog message signals independently of said analog voice signals.

7. The system of claim 5 wherein said conversion means includes a protocol converter.

8. The system of claim 5 wherein said conversion means are further connected to transmit user data in analog form.

9. The system of claim 5 further comprising a visual display at said digital telephone, said visual display being responsive to user-specific call messages that are transmitted with call-handling call messages within said analog message signals.

10. A method of enabling incoming and outgoing call capability for a digital telephone that is limited to analog transmissions comprising steps of:

locally supporting a digital protocol for operating said digital telephone, including supporting local digitized signals of voice information and call-handling call messages and party-specific call messages;

with regard to local digitized signals form said digital telephone, converting said local digitized signals to outgoing analog signals;

transmitting said outgoing analog signals to a remote site that supports reconverting said outgoing analog signals to digital signals, including transmitting said voice information to said remote site via telephone lines of a public telephone switching network and further including transmitting said call-handling call messages and said party-specific call messages to said remote site via a data network; and with regard to incoming analog signals directed to said digital telephone, converting said incoming analog signals into local digitized signals of voice information and call-handling call messages and party-specific call messages.

11. The method of claim 10 wherein said step that includes transmitting via said data network includes accessing an Internet Service Provider (ISP), said data network being the Internet.

12. The method of claim 11 wherein said step that includes transmitting via said data network is a step of utilizing at least one of a public and a private data network.

* * * * *